United States Patent [19]

Pierrat

[11] 4,357,973
[45] Nov. 9, 1982

[54] LOG SPLITTER WITH COUNTER-BALANCED WEDGE ASSEMBLY

[76] Inventor: Michel A. Pierrat, 48 Farrwood Dr., Andover, Mass. 01810

[21] Appl. No.: 166,053

[22] Filed: Jul. 7, 1980

[51] Int. Cl.³ .............................................. B27L 7/00
[52] U.S. Cl. .............................. 144/193 A; 211/49 D; 248/123.1
[58] Field of Search ............................. 248/123.1, 580; 211/49 D; 144/193 A, 193 R, 193 C, 193 D

[56] References Cited

U.S. PATENT DOCUMENTS

| 2,704,093 | 3/1955 | Brown | 144/193 A |
| 2,851,072 | 9/1958 | Gerjets et al. | 144/193 A |
| 3,161,295 | 12/1964 | Chesley | 211/49 D |
| 3,214,119 | 10/1965 | Jonsson et al. | 248/123.1 |
| 3,285,304 | 11/1966 | Fuller | 144/193 A |
| 4,102,373 | 7/1978 | Winiasz | 144/193 A |

Primary Examiner—W. D. Bray

[57] ABSTRACT

A log splitter of the type having a vertical frame formed of two spaced H-beams, a support movably mounted on the frame, a wedge assembly mounted on the frame, and a power drive for splitting a log by forcing the wedge into the log, and which includes two counter-balancing constant force springs arranged to apply an upward force to the wedge assembly sufficient to keep it from moving downwardly when the wedge assembly is not clamped to the frame, the springs being positioned in channels of the H-beams and connected between the ends of the H-beams and opposite ends of the wedge assembly with the object of reducing the physical exertion required in the operation of the log splitter and at the same time reducing the risk of personal injury that might be caused by a free falling wedge assembly.

5 Claims, 4 Drawing Figures

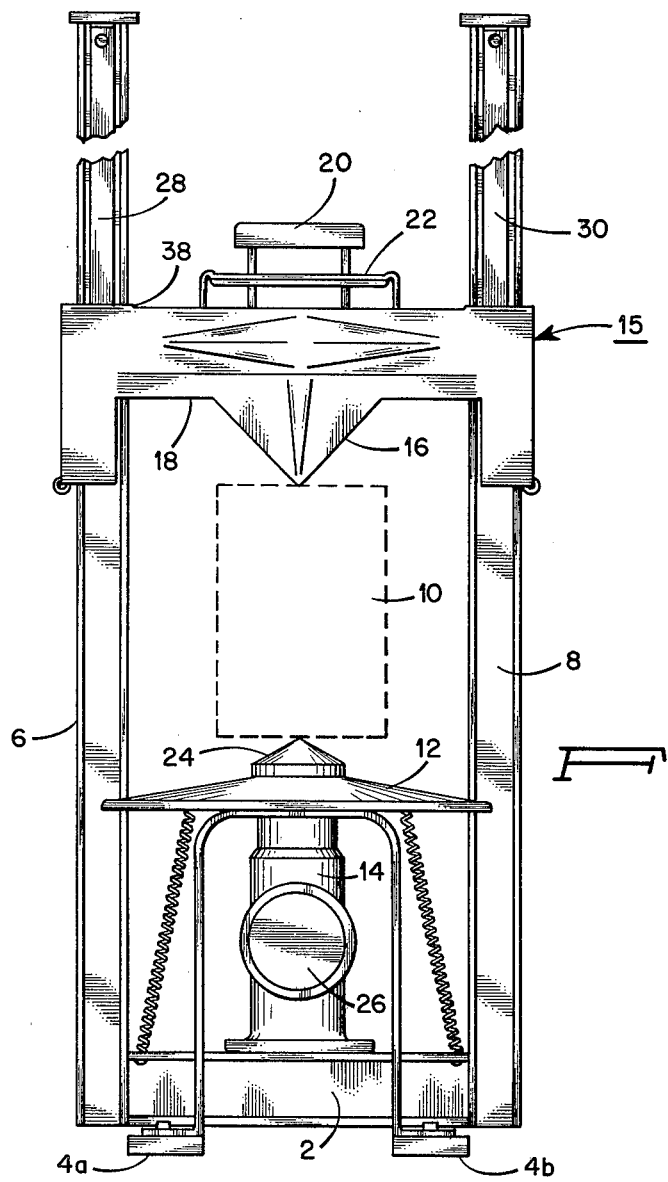
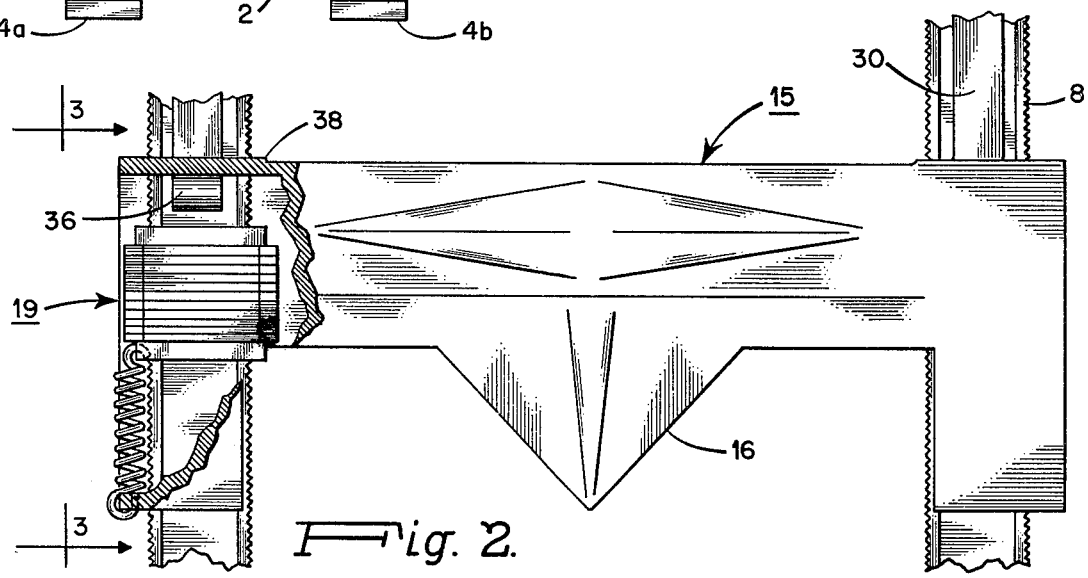

LOG SPLITTER WITH COUNTER-BALANCED WEDGE ASSEMBLY

CROSS REFERENCE TO RELATED APPLICATIONS

Reference is made to applicant's co-pending applications Ser. No. 873,060 for Log Splitter, now abandoned; Ser. No. 06/109,134 for Log Splitter with Protection Against Twisting Moments; and Ser. No. 06/053,199 for Log Splitter with Improved Clamp.

BACKGROUND OF THE INVENTION

1. Field of the Invention

This invention relates to an improved log splitter and more particularly to a counter-balancing arrangement that reduces the physical exertion required in using the log splitter and reduces the risk of personal injury associated with such use.

2. Description of the Prior Art

Power driven log splitters have been constructed in which the log to be split is positioned vertically between a support and a splitting wedge and the splitting force applied either to the wedge or the support. In most earlier log splitters, in which the log is positioned vertically, the wedge was fixed in position before the log was placed on the support and either the log or the wedge was moved by the power drive to bring the wedge into engagement with the end of the log. In the above-mentioned co-pending application Ser. No. 873,060 I have described a log splitter in which the wedge assembly is secured to the frame by a pair of quick-release clamps so that after the log is placed on the support, the wedge is manually lowered into engagement with the log before power is applied, minimizing the required stroke of the drive mechanism. However, each time a log is split the operator must support the weight of the wedge and its carriage to lower it into engagement with the log and, subsequent to the splitting stroke, lift the wedge and carrier assembly to its raised position. Because the structure must be heavy enough to withstand the large splitting forces, substantial physical effort is required to operate the splitter. In addition, there is the possibility the wedge and carriage assembly may be released accidentally to fall with substantial force upon the end of the log with the attendant risk of personal injury to the operator.

3. Summary of the Invention

A log splitter of the general kind described in the above-mentioned applications is provided with a constant force counter-balance for the weight of the wedge assembly that substantially reduces the effort required to manually lower and lift the wedge assembly and, in the event of accidental release of the wedge structure, reduces the risk of injury that might be caused by a free falling wedge.

BRIEF DESCRIPTION OF THE DRAWINGS

FIG. 1 is a front view of a log splitter embodying the invention;

FIG. 2 is an enlarged view of the wedge and carriage assembly with a portion of the carriage housing cut away to show the positioning of the counter-balance spring;

DESCRIPTION OF THE PREFERRED EMBODIMENT

Figure 3:
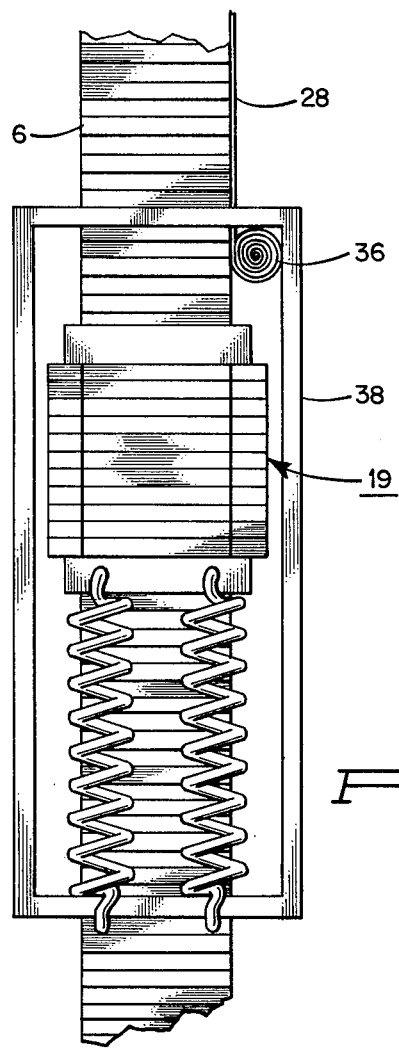
FIG. 3 is a further enlarged view taken along line 3—3 of FIG. 2 showing a side view of the location of the counter-balance spring.

The log splitter shown in FIG. 1 is generally similar to the kind described in the above mentioned copending applications and includes a base 2, supported on two horizontal runners 4a and 4b, that supports two vertical stanchions 6 and 8 formed of steel H-beams.

To support a log to be split, indicated by broken lines at 10, a destabilizing support 12 is positioned on top of a hydraulic jack 14 and is arranged to be guided for vertical movement along the stanchions 6 and 8. The ends of the destabilizing support are provided with notches that encompass opposite sides of the stanchions. This destabilizing support 12 is arranged to prevent the generation of destructive twisting moments and is described in detail in my co-pending application Ser. No. 06/109,134.

The splitting action is produced by a wedge assembly, generally indicated at 15, consisting of a splitting wedge 16 mounted on a carriage 18 arranged for vertical movement along the stanchions 6 and 8. The wedge assembly 15 includes two spring-biased quick-release clamps, as indicated at 19 in FIGS. 2 and 3, that normally clamp the carriage to the stanchions 6 and 8. The clamps are arranged to be released by the operator by gripping a handle 20 and a fixed brace 22 and applying a squeezing force. The construction of the carriage and clamps is described more fully in my co-pending application Ser. No. 06/053,199.

In use, the log 10 is placed on top of a projection 24 that extends upwardly from the destabilizing support 12 and the wedge assembly 15 is then lowered manually to bring the point of the wedge into engagement with the upper end of the log 10. The handle 20 is then released so that the carriage 18 is securely clamped to the stanchions 6 and 8. Power is then applied to an electric motor and drive mechanism, indicated diagramatically at 26, that drives the jack 14 to force the destabilizing support upwardly and cause the wedge to penetrate and split the log 10.

Figure 4:
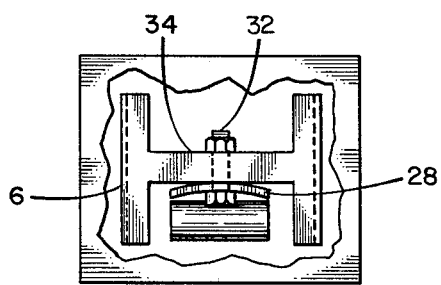
FIG. 4 is a top view of one of the supporting stanchions of the log splitter with part of its top cap cut away to show the position of the counter-balance spring in the channel of the stanchion.

To provide a counter-balance for the wedge assembly 15, two constant-force springs 28 and 30 are positioned at opposite ends of the carriage 18. The two springs are identical and only one spring 28 will be described in detail. The spring 28 is of the flat ribbon clock spring type, slightly curved in cross section, as shown in FIG. 4, and exerts a substantially constant tension force irrespective of the amount of the spring that is unrolled.

The upper end of the spring 28 is secured near the upper end of the stanchion 6 by a bolt 32 (FIG. 4) that extends through the cross-bar 34 of the stanchion. The spring 28 extends downwardly at the rear of the stanchion channel between the flanges 36 and 38.

The lower end of the spring 28 rolls by its own force into a coil 36 that is positioned within the housing 38 of the carriage 18 as shown in FIGS. 2 and 3. The coil is free to turn in the space provided so that the coil unwinds as the wedge assembly is lowered, and rewinds as it is moved up-wardly. The coil 36 is held captive between the housing 38 and channel of the stanchion 6, but is otherwise unrestricted. The spring 28 exerts an upward force on the wedge assembly 15 that is substantially constant irrespective of the vertical position of the wedge assembly. The combined counter-balancing forces of the two springs 28 and 30 is such that the carriage will remain in any position when the wedge assembly is released from the stanchions 6 and 8. That is, the force exerted by the spring is so nearly equal to the weight of the wedge assembly 15 that the friction between the carriage 16 and the stanchions is sufficient to prevent movement. Preferably, the counter-balance force is less than the weight of the wedge assembly by not more than thirty percent. In this embodiment, the weight of the wedge assembly 15 is about 17 pounds. The two springs 28 and 30 exert a combined upward force equal to about 15 pounds. The friction between the carriage 18 and the stanchions is great enough so that with those parameters the wedge will not, when released, move either upwardly or downwardly without the application of an external force and is suffgicient to dampen the system and prevent over-travel or excessive speed when lowering or raising the carriage.

The desired counter-balancing force can be generated by other means, such as weights connected through pulleys to the wedge assembly, but such weights would be awkward and could easily interfere with the operation when logs are being split. Ordinary tension coil springs have the disadvantage that with the magnitude of the required movement, the change in force exerted by the springs at different positions would prevent operation with the minimum physical exertion. Constant force piston type gas springs, such as are used for counterbalancing trunk lids of automobiles, are an acceptable alternative, but they are more expensive and would be subject to greater possibility of damage during the log splitting operation. The constant force flat springs, as described, provide an economical and practical answer to the problem. Moreover, the position of the springs within the channels of the H-beams protects the springs from damage that might otherwise be caused by accidental contact with a heavy log or other object.

From the foregoing, it will be seen that my invention provides a simple and effective counter-balance that is durable and low in cost and which results in a significant reduction in manual exertion and in the risk of physical injury.

I claim:
1. In a log splitter having
a frame including a first stanchion having a vertical channel therein,
a support mounted on said frame for supporting a log to be split,
a wedge assembly mounted for vertical movement on said frame, and
drive means arranged to cause relative closing movement between said wedge assembly and said support thereby to cause said wedge assembly to split said log,
the improvement comprising
force generating means comprising a constant-force spring positioned within said channel,
means connecting said force generating means to said wedge assembly, and
means connecting said force-generating means to said frame,
said force generating means being arranged to apply continual upward force to said wedge assembly relative to said frame.

2. Apparatus as claimed in claim 1 including
a second vertical stanchion having a channel therein, and wherein
said force-generating means includes a second constant-force spring positioned within said channel of said second stanchion.

3. In a log splitter having
a frame including two spaced vertically extending stanchions,
a support mounted on said frame for supporting a log to be split,
a wedge assembly mounted for vertical movement on said frame, and
drive means arranged to cause relative closing movement between said wedge assembly and said support thereby to cause said wedge assembly to split said log,
the improvement comprising
force generating means including first and second counter-balancing springs respectively connected between one of said stanchions and opposite ends of said wedge assembly,
said force generating means being arranged to apply continual upward force to said wedge assembly relative to said frame.

4. Apparatus as claimed in claim 3 wherein
each of said counter-balancing springs is a constant force spring.

5. In a log splitter having a frame comprising first and second vertically extending H-beams each having a vertically extending channel,
a support movably mounted on said frame for holding a log to be split,
a wedge assembly mounted for vertical movement on said frame and including a housing, a downwardly-extending splitting wedge, and clamping means normally clamping said wedge assembly to each of said H-beams and having a release position in which said wedge assembly is free to move on said H-beams, and
drive means arranged to cause said support to move upwardly thereby to drive said wedge into said log,
the improvement comprising
first and second constant-force springs positioned respectively in the channels of said first and second H-beams, each of said springs including a terminal coil at one end thereof,
means connecting one end of each of said springs between one of said H-beams and said wedge assembly, and means confining the said terminal coil of each of each of said springs to permit rotation thereof, the combined force exerted by said springs being within 30% of the force exerted by the weight of said wedge assembly when said clamps are in the released position.

* * * * *